Figure 1:
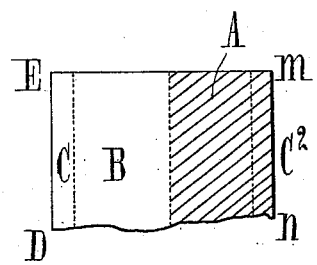

No. 824,446. PATENTED JUNE 26, 1906.
P. SECHIARI.
PIPE OR HOSE AND PROCESS OF MANUFACTURING THE SAME.
SPECIMENS. APPLICATION FILED JAN. 16, 1906.

WITNESSES
INVENTOR
ATTORNEYS

UNITED STATES PATENT OFFICE.

PARASCHEVA SECHIARI, OF PARIS, FRANCE, ASSIGNOR TO LA SOCIÉTÉ CIVILE D'ÉTUDES DE L'INDECHIRABLE GRIMSON, OF LYON-VILLEURBANNE, FRANCE.

PIPE OR HOSE AND PROCESS OF MANUFACTURING THE SAME.

No. 824,446.　　　　Specification of Letters Patent.　　　Patented June 26, 1906.

Application filed January 16, 1906. Serial No. 296,249. (Specimens.)

*To all whom it may concern:*

Be it known that I, PARASCHEVA SECHIARI, a subject of the King of Greece, and a resident of Paris, France, have invented certain new and useful Improvements in Pipes or Hose and Processes of Manufacturing the Same, of which the following is a specification.

For the manufacture of pipes or hose for various purposes, and of transportable hose in particular—such as watering or sprinkling pipes, fire-hose, &c.—a fabric alone or a fabric and india-rubber have hitherto been employed. It is needless to refer at length to the numerous defects of pipes or hose composed of fabric. They are not impermeable. Then they are not elastic, and accordingly these hose frequently break when coiled for transport, as is the case with fire-hose. Finally, they are speedily rendered useless by atmospheric variations. As regards hose formed of fabric and india-rubber manufactured by means of canvas cut on the bias (this being done in order to insure elasticity and flexibility both in the direction of the extension of the hose and in the direction of its expansion) and coated with india-rubber, they present the defect of being thick, and consequently very heavy, seeing that the strength which it is essential to obtain necessitates the employment of several plies of canvas, these several plies being then coated with india-rubber. Hose of this kind is badly adapted for transport, which renders it unsuitable for fire-hose, garden-watering, and the like.

The present invention has for its object to provide a hose of cork fabric which does not present any of the defects enumerated above, but which, on the contrary, combines various properties which could not be expected of canvas or canvas and india-rubber hose.

The method of manufacturing this hose consists, broadly, in taking a fabric of any appropriate kind, and in particular a special fabric termed "untearable" fabric, and completely covering it with cork upon both its faces, or by confining this operation to so coating the fabric that after the hose is formed its inner and outer surfaces only are covered with cork. The untearable fabric presents the advantage, as compared with all other fabrics which might be employed, that the weft-threads alone supply the resistance to the strains to which the fabric is subjected. These wefts extend at an angle of forty-five degrees to the warp-threads, so that it is unnecessary to cut the fabric on the bias. The fabric is therefore cut along its length into strips the width of which varies in accordance with the diameter of the hose and according to the number of plies or coverings. The strips thus formed are then covered upon both their faces with a sheet of demineralized or denaturized cork—viz., cork from which the mineral components have been removed in order to render it excessively supple—which sheets may be fixed thereon in any convenient manner, preferably by means of a cement having an india-rubber base, the adhesion between the cork and the fabric being rendered exceedingly complete by vulcanization. The cork is placed only upon those surfaces of the strip of fabric which will subsequently form the inner and the outer surfaces of the hose, the joints and the superposed portions of the plies or the overlapping portions having no cork between them. This is in no way essential, however, and there may be cases in which it is desirable to interpose a sheet of cork between each ply and also on the joints. In order to define this phase of the manufacture, an example may advantageously be given. Take the case of a two-ply hose of fifty millimeters the circumference of which in millimeters is one hundred and fifty-seven. The amount of fabric necessary for two plies will therefore be twice this length plus the overlapping necessary at the joint. This overlapping varies in accordance with the strength that it is desired to obtain. In the example selected this overlapping may be assumed to be thirty millimeters. It will therefor be necessary to cut a strip of fabric of $157 \times 2 + 30 = 344$ millimeters. In the first case if cork is placed only upon the parts intended to constitute the inner and outer surfaces of the hose the fabric is covered with cork in the manner represented in Figures 1 and 2 of the accompanying drawings.

Figure 2:
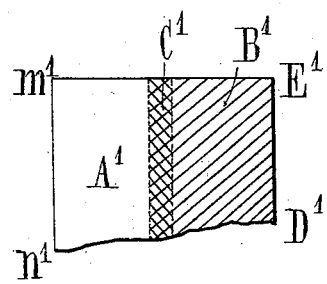

In Fig. 1 the fabric is shown on the face which will form the interior of the hose. Only the part A is covered with cork. Fig. 2, on the other hand, represents the face of the fabric which will form the exterior of the hose. Only the part B' will be covered with cork, and the part C' will remain free in order to permit of making the joint upon a surface not covered with cork. In other words, the fabric is covered with cork upon one side, starting at the edge m n of the strip for one hundred and fifty-seven millimeters, and from the other side, starting from the edge E' D' for one hundred and fifty-seven millimeters likewise. Whatever the diameter of the hose may be, the strip of fabric obtained in this manner is first of all compressed in order to obtain a perfect union between the cork and the fabric and then wound upon a mandrel of the diameter of the hose to be formed in such a manner that the part C coincides with the part C'. Care is previously taken to reduce the thickness of the edges C and C² by grinding them down, so that the finished hose presents no protuberance. The parts C, B, A', and C' have likewise been coated with an india-rubber solution in order to permit of sticking on vulcanization. When the fabric is wound, there is stuck upon the joint a thin sheet of cork fabric or of cork only. This is in order to hide the joint and prevent tearing away. Finally, the hose is strongly compressed upon the mandrel by means of a strip of fabric of some suitable kind, and vulcanization is effected by placing the whole in a digester apparatus. In the second case the fabric is completely covered with cork upon both sides. The two edges of the strip are made thinner by grinding them. The parts to be superposed are coated with india-rubber solution. The whole is wound upon the mandrel, and the procedure indicated above is followed.

Having thus described my invention, I claim as new and desire to secure by Letters Patent—

1. A pipe or hose made from a fabric the weft-threads of which are biased with respect to the warp-threads, said fabric being covered upon its inner and outer surfaces with sheets of demineralized cork fixed to the fabric by means of vulcanized india-rubber cement.

2. A pipe or hose composed of a number of plies of textile fabric, the inner and outer plies being covered with sheets of demineralized cork, said sheets being fixed to said plies, and the joints of the hose being formed, by vulcanized india-rubber cement.

3. The process of manufacturing pipes or hose, which consists in applying cork sheets to a fabric in such a manner that said sheets will cover the inner and outer surfaces of the hose when wound, said sheets being applied to the fabric by means of india-rubber cement, then winding the fabric upon a mandrel of the required diameter and joining the edges of the fabric by means of india-rubber cement, and then vulcanizing the hose thus formed.

4. The process of manufacturing pipes or hose, which consists in applying cork sheets to a textile fabric in such a manner that when said fabric is formed into a plurality of plies said sheets will cover only the inner and outer surfaces of the same, winding said fabric upon a mandrel of the required size, joining the edges of the fabric by means of india-rubber cement, and finally vulcanizing said cement.

In testimony whereof I have signed this specification in the presence of two subscribing witnesses.

PARASCHEVA SECHIARI.

Witnesses:
EMILE LEDRET,
HANSON C. COXE.